United States Patent
Hough et al.

[11] Patent Number: 6,123,436
[45] Date of Patent: Sep. 26, 2000

[54] OPTICAL DEVICE FOR MODIFYING THE ANGULAR AND SPATIAL DISTRIBUTION OF ILLUMINATING ENERGY

[75] Inventors: Thomas A. Hough, Dallas; James M. Bornhorst, Desoto, both of Tex.

[73] Assignee: Vari-Lite, Inc., Dallas, Tex.

[21] Appl. No.: 08/906,526

[22] Filed: Aug. 5, 1997

[51] Int. Cl.[7] ................. F21V 7/00; G02B 5/10; G02B 6/10; G02B 27/09
[52] U.S. Cl. ............ 362/296; 362/341; 362/347; 362/348; 359/858; 359/868; 359/869; 385/146
[58] Field of Search .................. 359/850, 851, 359/853, 857, 858, 868, 869, 837; 385/31, 39, 43, 146, 901; 362/32, 296, 307, 327, 347, 341, 348

[56] References Cited

U.S. PATENT DOCUMENTS

| | | | |
|---|---|---|---|
| 3,676,667 | 7/1972 | Malifaud | 240/41.35 R |
| 3,923,381 | 12/1975 | Winston | 350/293 |
| 3,957,031 | 5/1976 | Winston | 126/270 |
| 4,002,499 | 1/1977 | Winston | 136/206 |
| 4,003,638 | 1/1977 | Winston | 350/293 |

(List continued on next page.)

FOREIGN PATENT DOCUMENTS

| | | | |
|---|---|---|---|
| 0 271 956 A2 | 12/1987 | European Pat. Off. | G09F 9/35 |
| 0 322 069 A1 | 12/1988 | European Pat. Off. | G02B 19/00 |
| 0 764 862 A1 | 9/1996 | European Pat. Off. | G02B 6/42 |

OTHER PUBLICATIONS

PCT Search Report.
Warren J. Smith, *Modern Optical Engineering*, The Design of Optical Systems, 2nd Edition, 1990, pp. 229–230.
Karl G. Ruling, *Lighting Dimensions*, "Perusing the ProSpot", Apr. 1994, pp. 79.
Mitchell C. Ruda, "How and when to use a nonimaging concentrator", Talandic Research Corporation, pp. 51–58.
Chapter 11, "Illumination of Optical Systems and Instruments", pp. 201–209.
Ooi et al, *SID 95 Digest*, 16.2: Reflective–Type LCPC Projection Display, 1995, pp. 227–230.
W.E. Glenn, *SID 96 Digest*, 40.1: Invited Paper: Status of Projection Systems for the Electronic Cinema, 1996, pp. 903–906.
H. Hamada, *SID 96 Digest*, 40.3: Invited Paper: Otpical Systems for High–Luminance LC Rear Projection, 1996, pp. 911–914.
Roland Winston, Reprinted from *Applied Optics*, vol. 15(2), pp. 291–292 (Feb. 1976).

(List continued on next page.)

*Primary Examiner*—Ricky D. Shafer
*Attorney, Agent, or Firm*—David H. Judson

[57] ABSTRACT

A deconcentrating optic has an input aperture positioned near a point of minimum focus of a reflector, and has an output aperture which is larger than the input aperture. An inner surface connects the two apertures of the optic. The surface is reflective to visible light, and is shaped to decrease the angles of incident light rays from the reflector so that an emerging light beam is bounded by a cone the angle of which is less than or equal to the acceptance cone of a projection lens. The size and shape of the output beam is such that the object lying in the projection plane of the lens is fully illuminated but not overfilled. The inner surface of the reflecting optic may be selectively perturbed so that the object plane of the projection lens is uniformly illuminated. The general shape of the reflecting optic's inner surface may be parabolic, elliptical, hyperbolic, circular, conical, or combinations of these shapes. The perturbations of the inner surface may be protrusions on or indentations in the inner surface, and may have shapes that are circular, planar, triangular, parabolic, random, or any other shape. A solid deconcentrating optic is transparent throughout, having a reflective coating on its exterior surface except for an input and an output aperture surface, which may be curved to cooperate with reflections from the reflective coating on the exterior surface to produce the desired output irradiance distribution.

20 Claims, 10 Drawing Sheets

U.S. PATENT DOCUMENTS

| | | | |
|---|---|---|---|
| 4,922,107 | 5/1990 | Rabl et al. | 359/869 |
| 5,188,452 | 2/1993 | Ryan | 362/293 |
| 5,243,459 | 9/1993 | Winston et al. | 359/853 |
| 5,357,101 | 10/1994 | Plesko | 359/853 |
| 5,692,091 | 11/1997 | Cassarly et al. | 385/146 |

OTHER PUBLICATIONS

"Dielectric compound parabolic concentrators", pp. 56–57.

Ning et al, Reprinted from *Applied Optics*, vol. 26(2), pp. 300–305 (Jan. 15, 1987), "Dielectric totally internally reflecting concentrations", pp. 523–528.

Alan W. Greynolds, "Ray tracing through non–imaging concentrators", Talandic Research Corporation, pp. 10–17.

M. Collares–Pereira et al, Reprinted from *Applied Optics*, vol. 16(10), pp. 2677–2683, (Oct. 1977), "Lens–mirror combinations with maximal concentration", pp. 100–106.

Wen Cai et al, *SPIE* vol. 1528 Nonimaging Optics: Maximum Efficiency Light Transfer (1991), "Reflectors For Efficient and Uniform Distribution of Radiation for Lighting and Infrared Based on Non–Imaging Optics", pp. 118–128.

Kazunori Tanaka et al, *Applied Optics*, vol. 35, No. 4, Feb. 1, 1996, "Compound parabolic concentrator probe for efficient light collection in spectroscopy of biological tissue", pp. 758–763.

Irradiance in Focal Plane of a Smooth Elliptical Reflector

Irradiance in Focal Plane of an Elliptical Reflector with 90 Lunes

OPTICAL DEVICE FOR MODIFYING THE ANGULAR AND SPATIAL DISTRIBUTION OF ILLUMINATING ENERGY

FIELD OF THE INVENTION

The present invention relates to a light collection and delivery system for image projection applications, and especially to an optical device for modifying the angular and spatial distribution of the illuminating energy.

BACKGROUND OF THE INVENTION

In traditional light projection systems, a condenser lens gathers light from a light source and projects a light beam in a forward direction. A spherical retro-reflector placed behind the light source redirects light toward the condenser lens that would otherwise be lost. The condenser lens attempts to evenly distribute light over an object, the image of which is projected onto a distant surface (projection screen) by a projection lens placed in front of the object.

As described in Warren J. Smith, *Modern Optical Engineering*, 229–230 (1990), the condenser is used to form an image of the source in the pupil of the projector lens such that the lens aperture has the same brightness as the source. An object placed at the focal point of the projection lens is illuminated by light from the condenser lens which converges upon the focal point of the condenser. The condenser's focal point should lie at the principal point of the projection lens. The projection lens is used to form an image of a brightly illuminated object upon the distant surface of a projection screen. To obtain maximum illumination at the edges of the image projected on the screen, the condenser lens must be large enough to prevent vignetting and provide sufficient magnification to fill the pupil of the projection lens.

Practically, the projection condenser system described above suffers from high losses in the light collection system owing to poor coupling between the retro-reflector and the condenser lens, and from high losses in the condenser lens. The low efficiency of this system produces a dim image on the projection screen.

To improve the efficiency of a light projection system, the condenser lens and retro-reflector are replaced by an elliptical reflector, which gathers light more efficiently by surrounding the source which is placed at a first focus of the ellipse. The elliptical profile of the reflector "condenses" light at a second focus of the ellipse thereby eliminating the need for a condenser lens. Light rays converge upon the second focus bounded by a cone having a certain half angle. The cone's apex is located at the ellipse's second focus. The area illuminated by this system is inversely proportional to the cone's half angle. While the goal of this system is to uniformly illuminate an object at the ellipse's second focus, the actual distribution of light energy is typically peaked in the center. This peak becomes more pronounced as the cone angle increases and the illuminated area becomes smaller.

Since the elliptical reflector both collects and condenses light from the source, various properties of the reflector's geometry affect the performance of the system. The eccentricity of the reflector affects the spot size and uniformity of the light distribution at the second focus. A long, "slow" ellipse reflects light into a cone with a smaller half angle for a given diameter. Such an ellipse produces a more uniform, less peaked light distribution at the second focus. Also, the reflector's shape is less sensitive to surface errors. However, a slow ellipse has a longer focal length which results in a long illumination system, and the focused spot produced by the reflector is large.

A "fast" ellipse has a shorter focal length and produces a small focused spot. However, a fast ellipse has a larger cone angle for a given diameter and yields a less uniform, more highly peaked light distribution at the second focus. Also, the reflector's shape is more sensitive to surface errors.

Various properties of the light source also affect illumination system performance in that perfectly elliptical reflectors form images of point sources only. Extended sources increase the size of the spot produced at the reflector's second focus and increase the angles of the rays exiting the reflector.

Various properties of the projection lens affect optical system performance. To form a high quality image, the lens must be matched to the size of the object to be projected. A large object requires large, expensive lenses, while a small object can be projected by smaller, less expensive lenses. A projection lens accepts and projects light rays which approach the lens within an acceptance cone having a certain half angle. "Fast" lenses have a large acceptance cone and accept light over large illumination angles. However, fast lenses have highly curved, expensive elements which are difficult to design and fabricate, and result in large optical aberrations and poorer imagery. "Slow" lenses have smaller acceptance cone angles and therefore accept light within a narrow acceptance cone. Slow lenses have more slightly curved, less expensive elements which are easier to design and fabricate, and result in better imagery.

Various properties of the reflector and projection lens in combination affect system performance. A slow ellipse illuminating a slow lens has good imagery but poor efficiency because the large spot at the ellipse's second focus overfills the lens' entrance aperture. This reflector and lens combination results in the longest overall system length.

A slow ellipse illuminating a fast lens is a poor choice since the longer overall illumination system size and large illuminated spot size of the slow ellipse are retained in this combination. Also, there is the poor imagery of the fast lens, and much of the cost of the expensive fast lens is wasted as the lens' acceptance cone is not filled by the slow reflector.

A fast ellipse illuminating a fast lens produces the shortest overall optical system size and good efficiency. However, the high cost and poor image quality of the fast lens is prohibitive. Also, the fast ellipse produces a highly peaked irradiance distribution in the lens' object plane. The result is a poor image with nonuniform illumination.

The most desirable combination is a fast ellipse illuminating a slow lens. This arrangement yields a shorter overall system size, smaller object size, and better imagery at the least cost. However, light is vignetted in the slow lens due to overfilling of its narrow acceptance cone by the fast ellipse. Also, the projected irradiance distribution is highly peaked.

Figure 1:
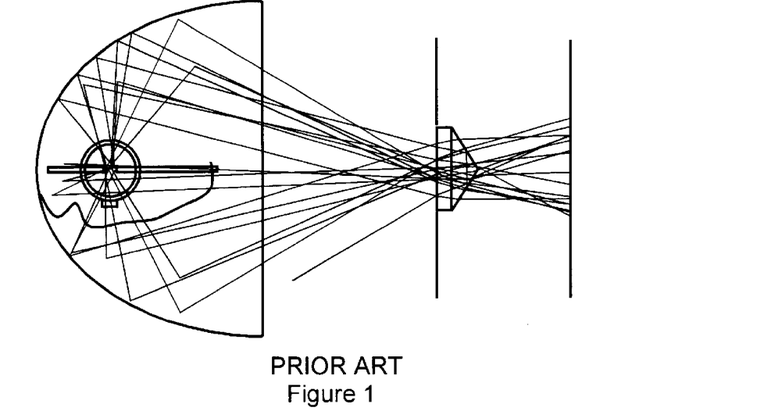
FIG. 1 is a ray-trace diagram of an illumination system using a cone prism according to the prior art.

A need exists to modify the angular and spatial distribution of the light collected by an elliptical reflector for projection applications. The prior art has shown a variety of techniques for accomplishing this objective. Y. Ooi et. al., "Reflective-Type LCPC Projection Display," *SID Digest of Technical Papers*, Vol. 26, 1995, pp. 227–230 describes an illumination system comprising an extended light source, an elliptical reflector, and a cone prism. The cone prism, as shown in FIG. 1, is a solid-glass, refracting device used to modify the angle of light exiting the reflector. While the cone prism does redirect light rays into a cone of smaller half angle, this optic is highly position-sensitive and must be placed behind the second focus of the reflector. If not, much of the light is subject to Total Internal Reflection (TIR) at the exit face and does not reach the object plane. When the optic is properly positioned, some light rays still undergo TIR. Finally, the irradiance distribution, while improved, is still not uniform.

The ProSpot luminaire made by Morpheus Lights, Inc. of San Jose, Calif., and as disclosed in the April 1994 issue of Lighting Dimensions magazine, used an arc lamp coupled with an ellipsoidal reflector to direct light toward an image plane. An internally mirrored tube reflects the outer periphery of the spray of light from the reflector back in toward the center, at once flattening the field at the image plane and increasing the efficiency of the luminaire.

Another internally mirrored tube is disclosed in U.S. Pat. No. 5,188,452. A "light mixing channel 22" is described as an elongate, longitudinally-extending, polygonal tubular structure, hollow and open at both ends, whose interior sides may be straight, tapered or curved and are mirrored or polished so as to reflect visible light rays. The light mixing channel is used, as shown in FIG. 23 thereof, to combine light rays that have been filtered through one or more color filters with un-filtered light rays so as to produce a homogeneous color wave front at the exit of the channel. But, as shown in FIG. 5 thereof, the light mixing channel of the referenced patent does nothing to alter the angle of light rays approaching a projection lens, but merely extends the length of the optical system between the second focal point of the reflector and the object plane of the projection lens.

Another technique utilizes a Fresnel converging lens positioned behind the second focus of an elliptical reflector to reduce the angle of diverging light rays so as to match the angle of a projection lens' acceptance cone. This technique yields a relatively large object size and a large overall system size, while providing only poor angle control. The Fresnel lens also does little to modify the spatial distribution of the light illuminating the lens' object plane.

Figure 2:
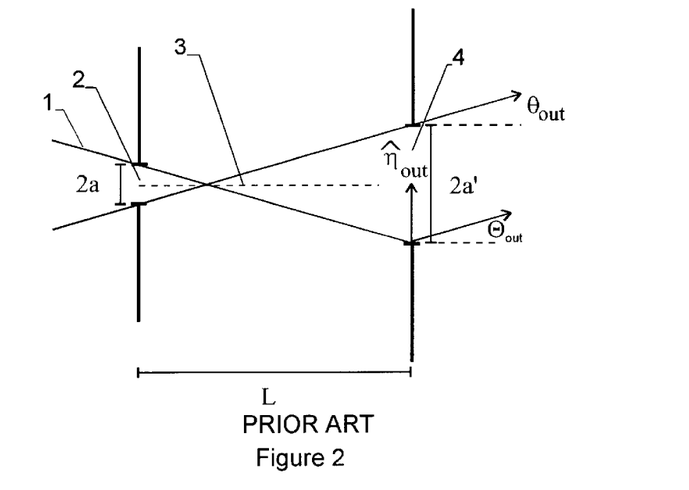
FIG. 2 is a geometric diagram of a pair of apertures which serve to act as a two-aperture angle filter according to the prior art.

A technique for limiting the angles of the rays entering a projection lens is shown in FIG. 2, and utilizes a system of apertures comprising two circular holes cut into two flat plates. Such a system of apertures is often employed in microscopes, telescopes, and other diagnostic optical instruments. This system of apertures or baffles acts as an angular filter. When the input aperture 2 is illuminated, the rays exiting the output aperture 4 are bounded by a cone whose half angle is defined by the aperture diameters and the distance between the apertures. All rays with angles greater than the allowed exit angle, $\theta_{out}$, do not pass through the rear aperture. However, rays bounded by the cone with half angle $\theta_{out}$ pass through both apertures without striking the two plates. If $\theta_{out}$ matches the half angle of the projection lens' acceptance cone, these rays propagate successfully through the lens.

If the angle of the projection lens' acceptance cone is known, and the input and output aperture diameters are chosen, then the distance between the apertures is uniquely determined. From the geometry in FIG. 2, the length of this device is given by $$L = a + a'/\tan\theta_{out}$$

where a' is the radius of the output aperture, a is the radius of the input aperture, $\theta_{out}$ is the half angle of the cone bounding the exit beam, and L is the distance between the two apertures.

Figure 3:
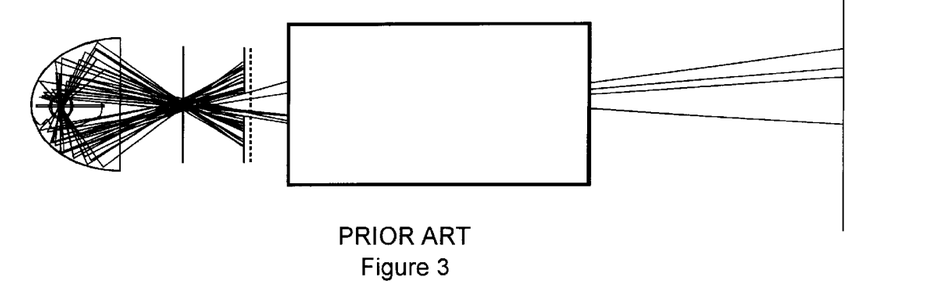
FIG. 3 is a ray-trace diagram of a two-aperture angle filter in an optical system according to the prior art.

The effect of a two aperture angle filter on a projection system employing a fast ellipse and a slow projection lens is shown in FIG. 3. Here, rays from the ellipse impinge on a system of two apertures that defines a cone whose half angle matches the projection lens' acceptance cone. The rays that pass through both apertures propagate successfully through the lens. However, these rays represent only a small percentage of the rays that pass through the first aperture.

The goal is to place a device between the two apertures that will modify the angles of the light passing through these apertures so that the light passing through the output aperture will propagate successfully through the projection lens. No complete solution to this problem currently exists.

OBJECTS OF THE INVENTION

It is an object of the invention to provide an optical device that matches a high angle light collection system to a low acceptance angle projection lens, providing: an area of high irradiance suitable for placing an object to be illuminated for projection, that area being somewhat larger and filled with less concentrated light than that area provided by a reflector system alone; improved light distribution within the illuminated area; a high acceptance angle for incoming light; a reduced illumination angle for the projection lens; and high efficiency operation.

SUMMARY OF THE INVENTION

The object of the invention is met by an illumination system for a projection system, the illumination system comprising:

1) an extended light source;
2) a high angle collection system that minimizes the focused spot size;
3) a deconcentrating optic whose input aperture is positioned at the reflector's minimum focus and whose output aperture is larger than its input aperture; and
4) a projection lens with reduced acceptance angle, relative to the high angle of the collection system.

The deconcentrating optic of the present invention serves three purposes. First, it decreases the angles of the incident rays so that the emerging beam is bounded by a cone whose half angle matches the acceptance cone of the projection lens. The decrease in ray angles is accomplished via reflection from the optic's inner surface. Direct illumination of the object to be illuminated is limited by controlling the size of apertures formed in the deconcentrating optic. Second, it controls the area to be illuminated so that the projection lens' object plane and input aperture are fully illuminated. The output aperture of the deconcentrating optic closely matches the size of the object to be illuminated, and the object is placed in close proximity to the deconcentrating optic's output aperture so that over-filling or under-filling of the object plane does not occur. Third, the general shape and selective perturbation of the deconcentrating optic's inner surface produces uniform illumination of the projection lens' object plane.

DETAILED DESCRIPTION

Figure 4:
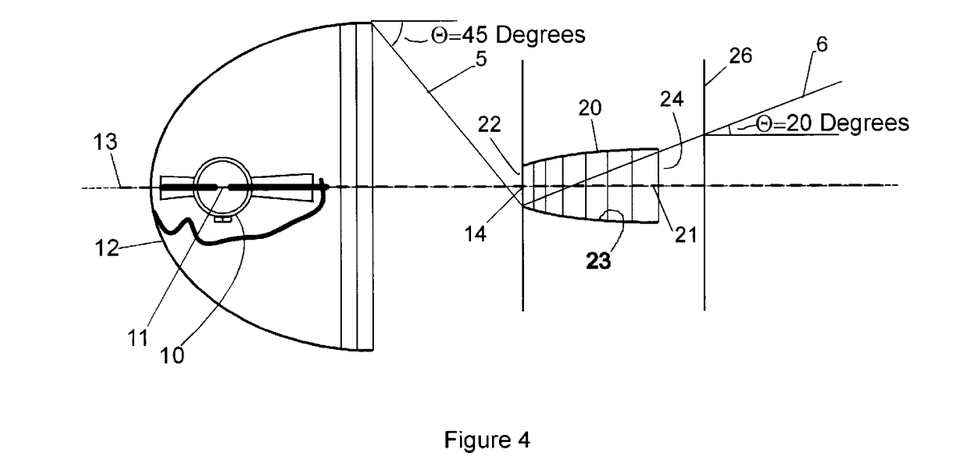
FIG. 4 is a geometric diagram of an illumination system according to the present invention.
Figure 5:
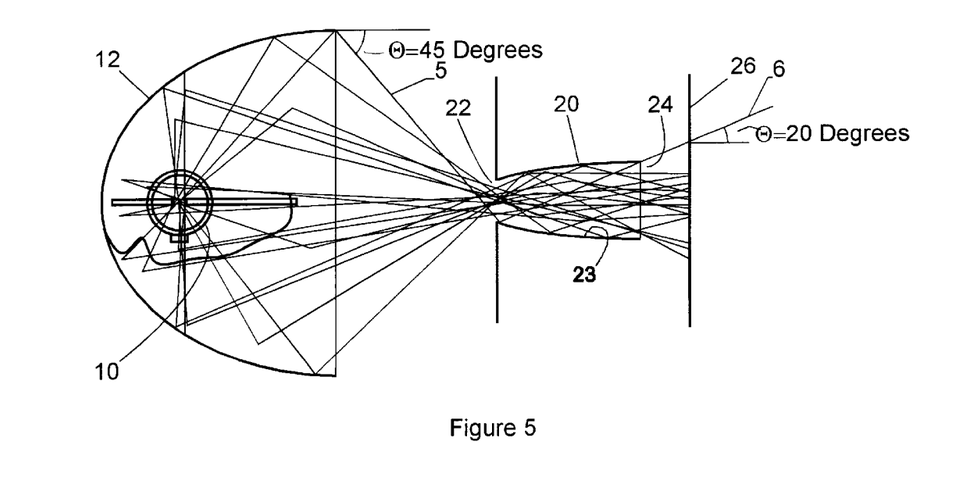
FIG. 5 is a ray trace diagram of an illumination system according to the present invention.

FIG. 4 shows a diagram of an illumination system according to an aspect of the present invention. FIG. 5 shows a ray-trace diagram of the illumination system shown in FIG. 4. A light source or lamp 10 is located at a first focal point 11 of an elliptical reflector 12. Optical axis 13 extends through a first focal point 11 and a second focal point 14. A deconcentrating optical device 20, also called a deconcentrator, having a longitudinal axis 21, an input aperture 22 and an output aperture 24, is located coaxially with optical axis 13 such that the input aperture 22 is located near the second focal point 14 of the reflector 12. Input aperture 22 and output aperture 24 are preferably circular, but other shapes are possible such as square and rectangular shapes.

Light rays from the light source 10 are collected and focused onto a spot of minimum size at the input aperture 22 of the deconcentrating optical device 20. The deconcentrating optical device 20 is called a deconcentrator because the average irradiance (energy per unit area) in the output aperture 24 is less than the average irradiance in the input aperture 22. The emerging beam has a larger cross sectional area than the incident beam, and thus will fully illuminate a projection lens' object plane. As shown in FIG. 4, light rays exiting the reflector 12 are bounded by a cone with a half angle θ of approximately 45 degrees. The illumination cone of elliptical reflector 12 is steep because the distance between its two focal points 11 and 14 is short and therefore its θ is large. A reflector with a steep illumination cone is chosen to save space in the optical system, minimize the focused spot size, and increase collection efficiency. As shown in FIG. 4, the beam exiting the deconcentrator 20 is bounded by a cone whose half angle is approximately 20 degrees. The angle of the exiting beam matches the acceptance cone of the projection lens (not shown), which also has a half angle θ of 20 degrees. Therefore, most of the light generated by the source 10 illuminates the object plane and propagates successfully through the lens without losses.

Deconcentrator Surface Profile

The deconcentrator 20 is a reflecting optic having an elongated body placed between and thereby connecting the two apertures 22 and 24. Determining the surface normals of the deconcentrator 20 at its input aperture 22 and output aperture 24 allows the inner reflecting surface 23 of the deconcentrator 20, as defined by a smooth curve, to be described.

Figure 6:
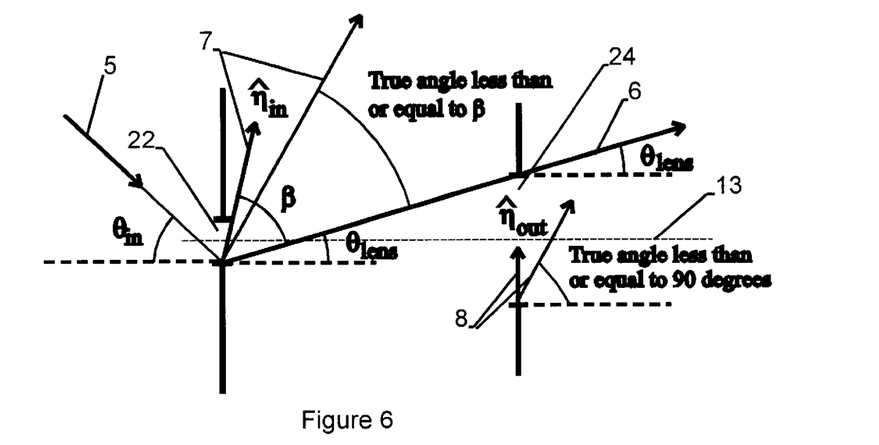
FIG. 6 is a geometric diagram illustrating a surface normal condition at a deconcentrating optic's input aperture according to the present invention.

The surface normal at the output aperture 24 will be described first. Referring again to the geometry shown in FIG. 2, the angle of a ray 1 entering the top edge of an input aperture 2 and exiting the bottom edge of an output aperture 4 matches the half angle of the lens' acceptance cone. Therefore, since this ray will propagate through the lens, the surface normal of a deconcentrating optic should be at least perpendicular to the optical axis 3 at this point. The surface will thus reflect this ray back in the upward direction without changing its angle relative to the optical axis. Thus, as shown in FIG. 6, the surface normal 8 to the inner reflecting surface of the deconcentrator 20 at the output aperture 24 should preferably be perpendicular to the optical axis 13, but may also be angled toward the lens.

Next, the surface normal at the input aperture 22 will be described. Referring to FIG. 4 and FIG. 6, the ray 5 exiting the elliptical reflector 12 with the largest possible angle impinges on the edge of the input aperture 22. Also shown is ray 6 originating at the bottom edge of the input aperture 22 whose angle matches the acceptance cone of the projection lens. At the point where rays 5 and 6 intersect, the deconcentrator must reflect the incident ray 5 into the exiting ray 6. Therefore, as shown in FIG. 6, the surface normal 7 at the point of contact preferably must bisect these two rays, but may also be angled toward the lens.

The surface normal 7 at the input aperture 22 can be described by the angle it makes with the incident ray 5 and the exiting ray 6 as follows:

$$\beta = 180 - \theta_{in} - \theta_{lens}/2,$$

where β is the angle of the surface normal 7 with respect to the incident ray 5 and exiting ray 6, $\theta_{in}$ is the angle of the incident ray 5, and $\theta_{lens}$ is the angle of the exiting ray 6. The half angle of the lens' acceptance cone will be denoted by $\theta_{lens}$ as well.

The goal is to determine the form of a smooth curve that passes through the input aperture 22 and the output aperture 24 such that the surface normals 7 and 8 at these points are bounded as described above. It is important to note that the surface normals 7 and 8 depend entirely on the geometry of the optical system, including the reflector speed, lens speed, and the size of the object to be projected. The speed of the elliptical reflector and the projection lens' acceptance cone thus determine the surface normals 7 and 8 at the input aperture 22 and output aperture 24. Therefore, the profile of the deconcentrator 20 optic is unique to the particular reflector 12 and lens used in the optical system.

Figure 7:
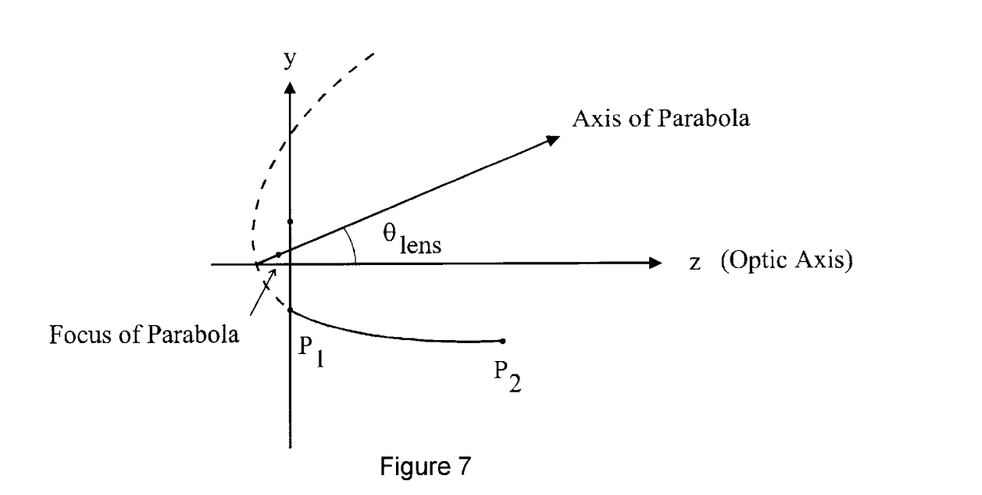
FIG. 7 is a geometric diagram illustrating a cross-sectional profile of a parabolic profile deconcentrator (PPD) according to the present invention.

In one embodiment of the present invention, the deconcentrator 20 has a parabolic profile as shown in FIG. 7. The profile is calculated by requiring that two points, $P_1$ and $P_2$, on the parabola pass through the edges of the input aperture 22 and output aperture 24, with the surface normal at point $P_2$ being substantially perpendicular to the optical axis 13 and the surface normal at point $P_1$ substantially bisecting an angle between incident ray 5 and exiting ray 6, and that the parabola's focal point lie somewhere to the left of the input aperture 22 (outside the deconcentrator 20). The parabola's axis passes through the input aperture 22, and it makes an angle with the optical axis 13 that is equal to the half angle $\theta_{lens}$ of the projection lens' acceptance cone. In addition to having a parabolic profile, the deconcentrator 20 may also have an elliptical, hyperbolic, circular or a conical profile. Also, the deconcentrator 20 may be segmented with each segment having a different profile, including any combination of aforementioned profiles.

Figure 8:
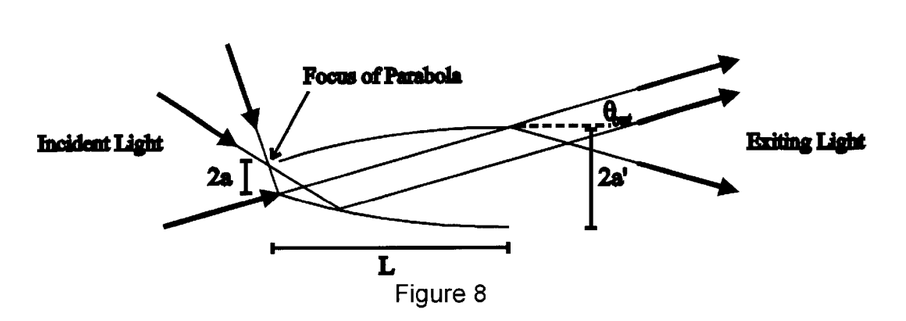
FIG. 8 is a geometric diagram of a parabolic profile deconcentrator (PPD) according to the present invention.
Figure 9:
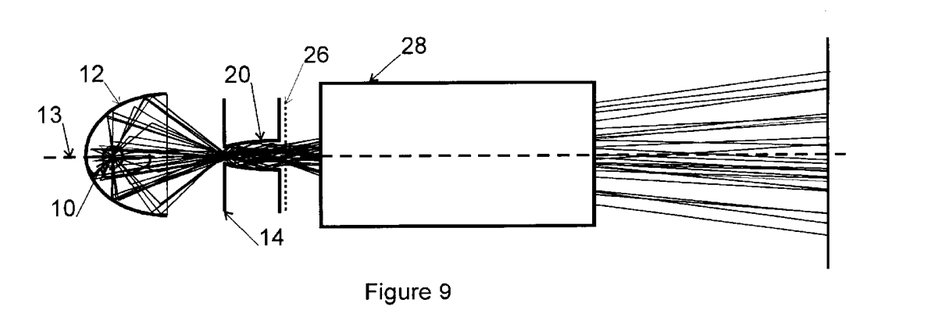
FIG. 9 is a ray-trace diagram of an optical system employing a deconcentrator according to the present invention.

The parabola that passes through these points is rotated about the optic axis 13 (z-axis) to form a rotationally symmetric reflecting surface. FIG. 8 shows an example of a parabolic profile deconcentrator (PPD) according to the present invention. FIG. 9 shows a ray-trace diagram of a typical optical system employing a parabolic profile deconcentrator according to the present invention. The complete optical system comprises the illumination system shown in FIG. 4 and FIG. 5 coupled with a projection lens 28. An object placed at the intersection of optical axis 13 and object plane 26 is illuminated by source 10 coupled to reflector 12 and deconcentrator 20. By comparing the ray-trace diagram of this optical system with that shown in FIG. 3, it can be seen that the effect of the deconcentrator is to increase the number of light rays projected by the lens array.

The Compound Parabolic Concentrator

The flux delivery problem, wherein one seeks to produce uniform irradiance distribution bounded by a cone of known half angle, is related to the problem of flux concentration. In the concentration problem, one seeks to collect light and concentrate it onto an area of minimum size. The most well-known device for accomplishing the concentration task is the compound parabolic concentrator (CPC), which was invented by Roland Winston and is disclosed in U.S. Pat. Nos. 3,923,381; 3,957,031; 4,002,499 and 4,003,638.

Figure 10:
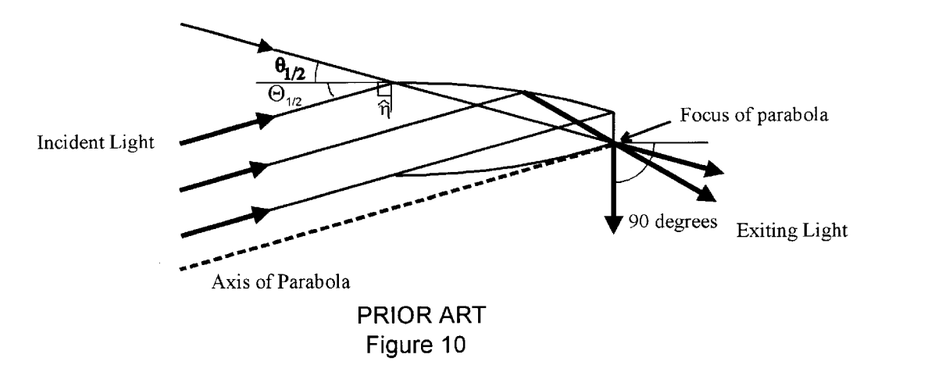
FIG. 10 is a geometric diagram of a compound parabolic concentrator (CPC) according to the prior art.

FIG. 10 shows a conventional CPC being used to concentrate radiation. Here, light enters the CPC bounded by a cone with a known half angle $\theta_{1/2}$, and exits the CPC bounded by a cone whose half angle is equal to 90 degrees. The incoming ray cone is determined by the size of the light source and its distance from the CPC's input aperture. The CPC is an ideal concentrator, meaning that the emerging beam is of minimum size, is directed into all possible angles, and that all rays incident on the input aperture and within its acceptance cone exit through the output aperture. If the concentrator were not ideal, some rays would undergo multiple reflections and reverse direction, thereby exiting through the input aperture.

In order for the CPC to be an ideal concentrator, its parabolic profile must meet four requirements. First, one point on the parabola must pass through the edge of the input aperture. At this point, the parabola's surface normal must be oriented at 90 degrees to the optic axis. Second, one point on the parabola must pass through the edge of the output aperture. Third, the parabola's focal point must pass through the opposite edge of the output aperture. Finally, the parabola's axis must be tilted at an angle with the optic axis that is equal to the half angle of the cone bounding the incident radiation. The tilted parabola is then rotated about the optic axis to produce the CPC.

Figure 11:
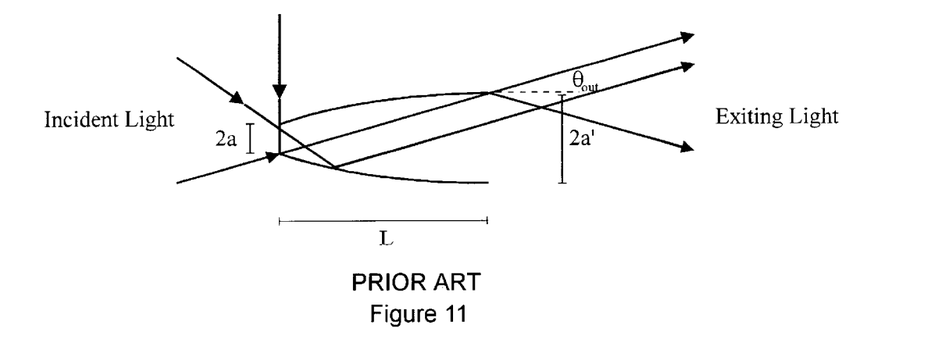
FIG. 11 is a geometric diagram of a CPC used as a deconcentrator according to the prior art.

Others have used the CPC in reverse to deconcentrate light. Particularly, K. Tanaka et al, "Compound Parabolic Concentrator Probe for Efficient Light Collection in Spectroscopy of Biological Tissue," Applied Optics Vol. 35, No. 4, Feb. 1, 1996, describes a miniature CPC incorporated into a fiber-based, near-infrared Raman spectrometer system. The CPC is used by Tanaka to match light rays emerging from a tissue sample to optical fibers that conduct light to the spectroscope. This works very well if the input radiation is bounded by a cone whose half angle is equal to 90 degrees. FIG. 11 shows a conventional CPC used as a deconcentrator. Here, the CPC's shape is specified in terms of the input aperture diameter and the angle of the exiting radiation. Once these two quantities are specified, the diameter of the output aperture and the length of the CPC are uniquely determined.

In FIG. 11, the half angle of the cone bounding the exiting radiation is denoted by $\theta_{out}$, and the radius of the output aperture is denoted by a'. In terms of these quantities, the length of the CPC is given by $$L = a'(1+\sin\theta_{out})\cos\theta_{out}/\sin^2\theta_{out}$$

The input aperture radius is denoted by a, and is given by $$a = a'/\sin\theta_{out}$$

To illustrate the deficiency of a CPC as a deconcentrator, consider, as an example, the design of a typical illumination system. The goal is to focus light from an extended arc source onto a spot 0.500 inches (12.7 mm) in diameter at which the light enters the deconcentrator. The light exiting the deconcentrator illuminates the projection lens' object plane. The object plane is circular with a diameter of 0.900 inches (22.9 mm), and the projection lens has an acceptance cone whose half angle is 20 degrees.

Since the shape of a CPC depends only on the size of the output aperture and the angle of the incident radiation, a traditional CPC with an input aperture of 0.500 inches and an output angle of 20 degrees would have a length of 2.70 inches (68.6 mm) and an output aperture diameter of 1.46 inches (37.1 mm). This device is rather long. However, the greater problem is that the output aperture is far too large for the application. This device, when used in reverse to deconcentrate light, overfills the lens' object plane. The result is that light is blocked by the 0.900-inch aperture in the object plane. The question arises, why not simply shorten this CPC until it's output aperture diameter is 0.900 inches? If the CPC is cut back so that its output aperture is 0.900 inches in diameter, its length would be 0.372 inches (9.45 mm). The device, when used in reverse to deconcentrate light, would have an exit angle of 57 degrees, which is much greater than the 20 degree half angle of the lens' acceptance cone. Thus, most of the light exiting the CPC would be lost to vignetting in the projection lens.

The CPC and the PPD Compared.

The difference between the CPC and the PPD is that the focus of the parabola defining the profile of the PPD does not lie on the edge of the input aperture, as it does in the case of the CPC. Although this seems a minor difference, it will be shown below that relaxing this constraint results in greater freedom in the design of the PPD, and makes the CPC a specialized case of the PPD.

Consider again the design of a typical illumination system described as an example above. The goal, as stated before, is to focus light from an extended arc source onto a spot 0.500 inches in diameter at the deconcentrator's input aperture. The light exiting the deconcentrator illuminates the projection lens' object plane. The object plane is circular with a diameter of 0.900 inches, and the projection lens has an acceptance cone whose half angle is 20 degrees.

The PPD's profile is defined in terms of the input and output aperture diameters, and the angle of the exit beam. This can be done because in the PPD of the present invention, the parabola's focus lies in front of the PPD's input aperture. This allows all three of these parameters to be specified in the design. A PPD with an input aperture of 0.500 inches, an output aperture of 0.900 inches, and an exit angle of 20 degrees has a length of 1.70 inches (43.2 mm). This length is 1.0 inch (25.4 mm) shorter than in a traditional CPC used in reverse, and the output aperture diameter of the PPD is of the proper size.

However, it should be noted that if a length of 2.70 inches were permissible, a PPD having an input aperture of 0.500 inches and an output aperture of 1.46 inches as described above has a calculated profile curve that lies over the traditional CPC curve in this case. In this case, the parabola's focal point lies at the edge of the optic's input aperture for both the PPD and the CPC. Therefore, the CPC is a special case of the PPD.

The Fluted PPD

The parabolic profile deconcentrator of the present invention efficiently reflects high angle rays into low angle rays that are able to propagate successfully through a projection lens. Thus, two of the three objectives of the PPD have been met. The PPD transmits light bounded by the projection lens' acceptance cone, and it fully illuminates the object plane. However, the final objective is not met by the standard PPD. Namely, the irradiance distribution in the object plane is not uniform.

Figure 12:
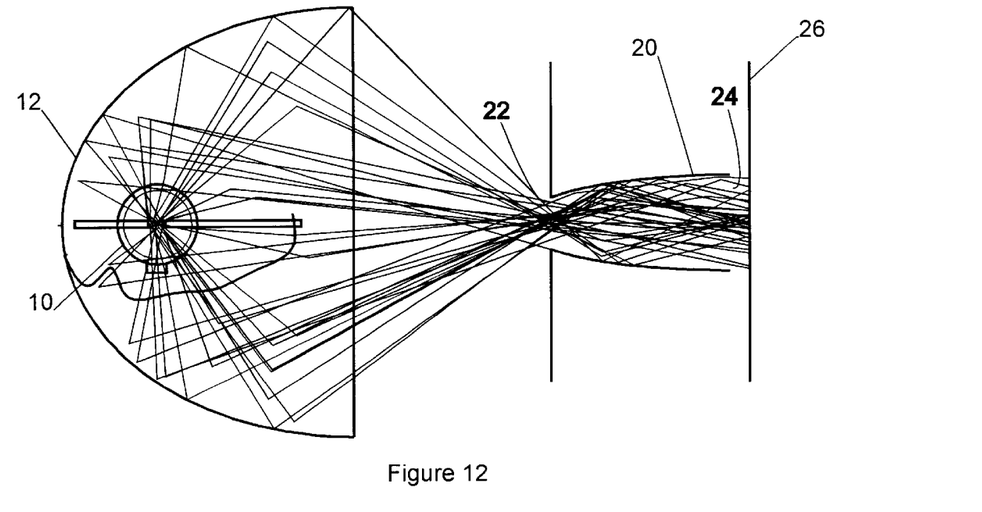
FIG. 12 is a ray-trace diagram of an illumination system with a smooth PPD according to the present invention.
Figure 13:
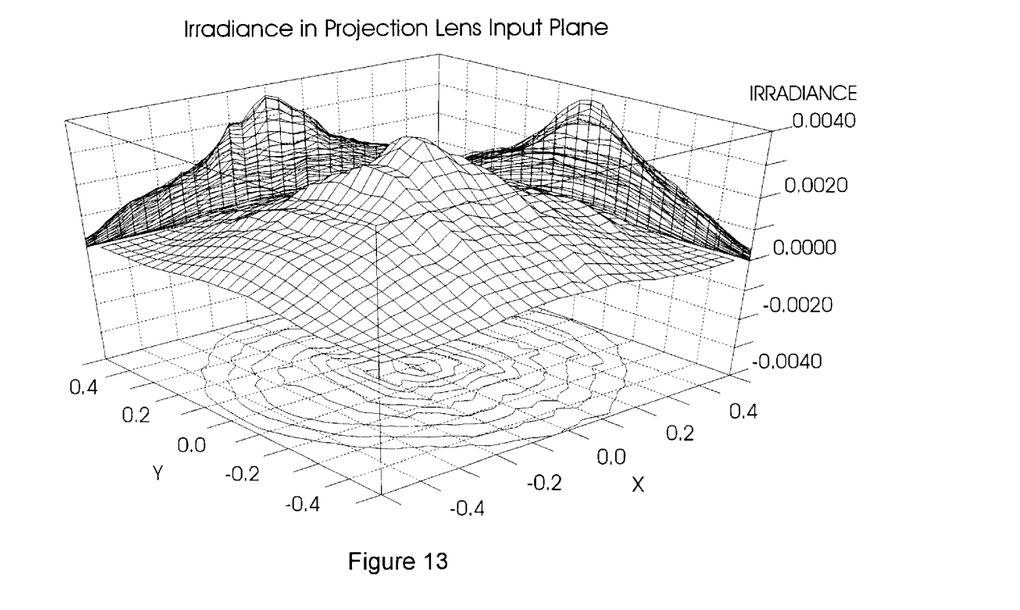
FIG. 13 is three-dimensional representation of the irradiance in a projection lens object plane due to a fast ellipse and a smooth PPD according to the present invention.

FIG. 12 shows a ray trace diagram of an illumination system utilizing a PPD of the present invention wherein the PPD has a smooth parabolic profile. As shown in FIG. 12, the rays in the center of the projection lens' object plane have a large density. FIG. 13 shows a three dimensional representation of the irradiance in the object plane of the illumination system shown in FIG. 12. As shown in FIG. 13, this peaked distribution is bright in the center and dim at the edges.

Figure 14:
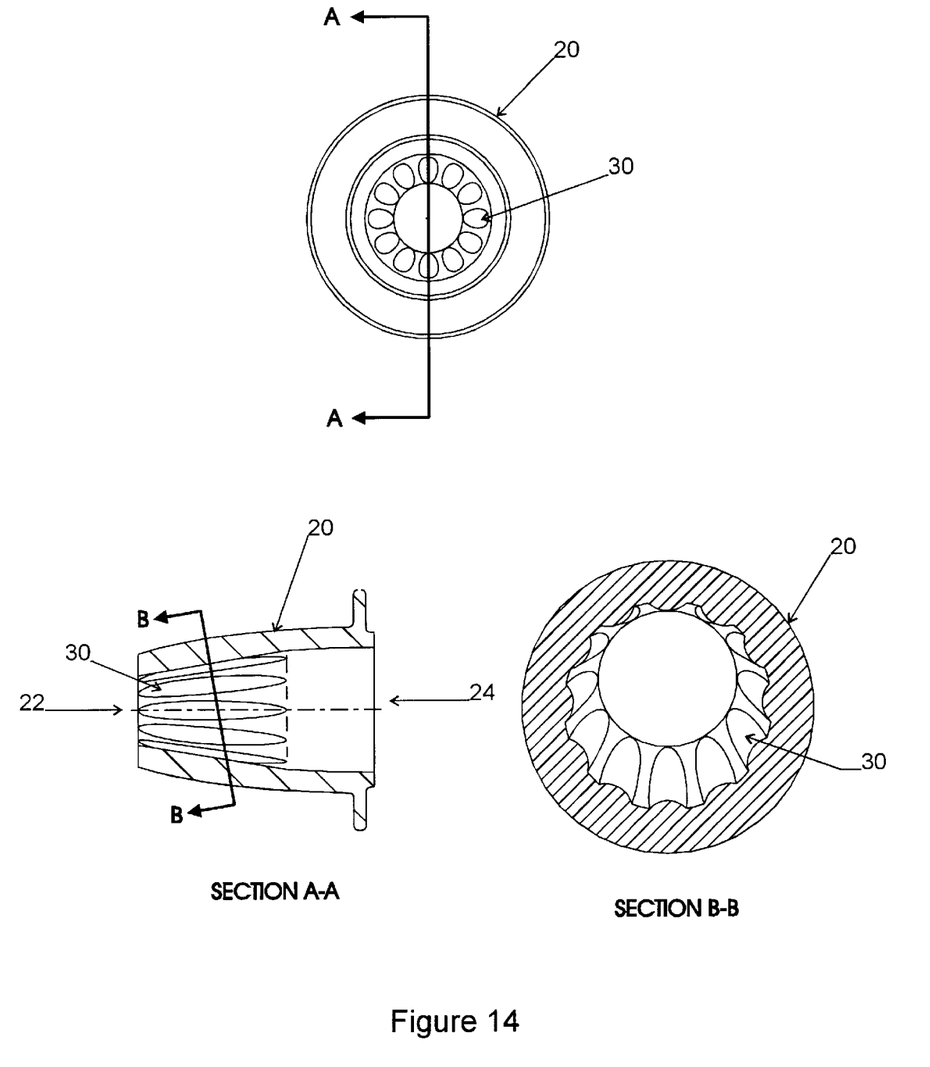
FIG. 14 is cross-sectional view of a fluted PPD according to a further aspect of the present invention.

The smooth shape of the standard PPD's inner surface causes a large percentage of the rays to reflect toward the center of the lens' object plane, thereby causing the peaked irradiance distribution in this plane. Since the input flux distribution is not uniform, the irradiance of the projected image is not uniform either. In order to remedy this situation, as shown in FIG. 14, a smooth PPD is slightly perturbed by a series of flutes 30 that reside on top of the PPD's parabolic reflecting surface. The flutes 30 are reflecting as well, and produce skew rays that reflect toward the edge of the object plane thereby integrating and smoothing the emerging beam. In one embodiment, the flutes 30 are formed by the intersection of circular cylinders with the parabola of the PPD and thus have a circular cross section. However, the flutes 30 could be planar, triangular, or any other shape and they could also be indentations in the PPD's surface. The number of flutes, their size, and their shape are chosen so that the irradiance distribution in the lens' object plane is uniform yet vignetting is still avoided. Therefore, the output cone of an unperturbed deconcentrating optic is calculated, and then flutes are selected that cause the output distribution to be more uniform while the exiting rays are still bounded by the output cone of an unperturbed deconcentrator.

Figure 15:
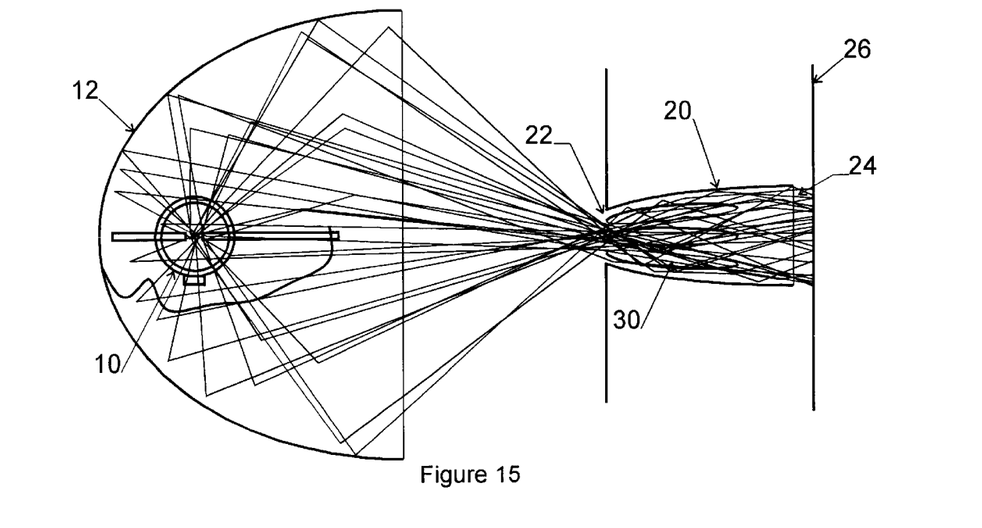
FIG. 15 is a ray-trace diagram of an illumination system with a fluted PPD according to the further aspect of the present invention.
Figure 16:
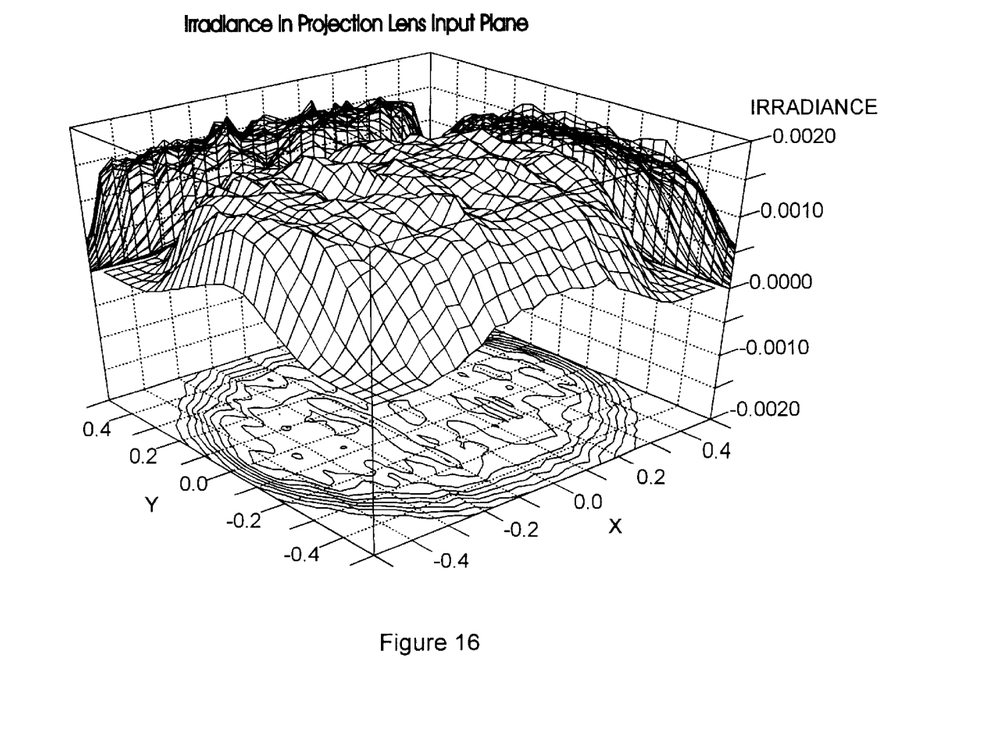
FIG. 16 is a three-dimensional representation of the irradiance in a projection lens object plane due to a fast ellipse and a fluted PPD according to the further aspect of the present invention.

FIG. 15 shows a ray trace diagram of an illumination system according to the present invention utilizing a fluted PPD as described above. As shown in FIG. 15, the rays appear uniformly distributed in the object plane. FIG. 16 is a three dimensional plot of the irradiance in the object plane of the illumination system in FIG. 15. The irradiance distribution in this plane is now nearly completely uniform.

Luned and Faceted Reflectors

Figure 17:
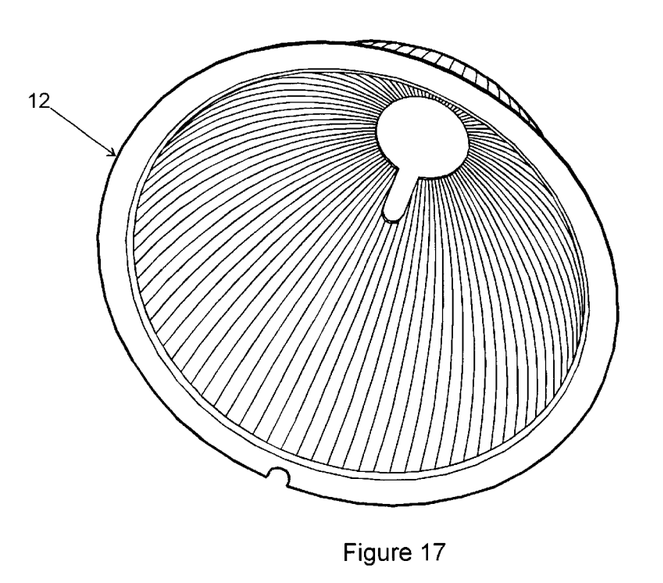
FIG. 17 is a perspective view of a luned elliptical reflector.
Figure 18:
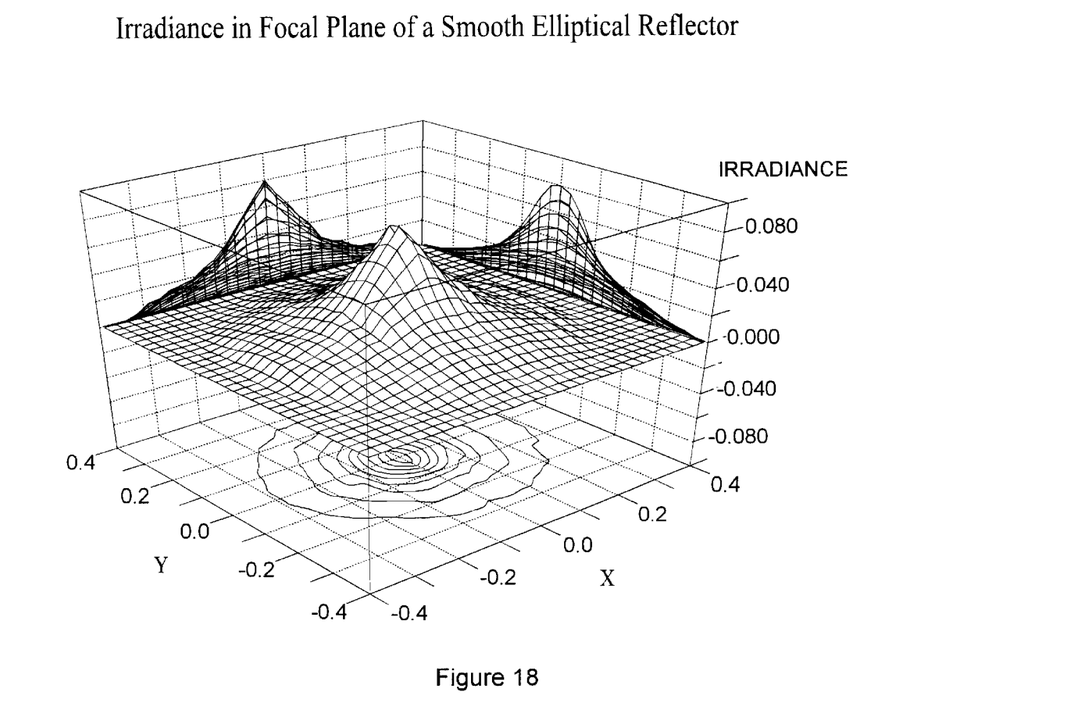
FIG. 18 is a three-dimensional representation of the irradiance in a focal plane of a smooth elliptical reflector.
Figure 19:
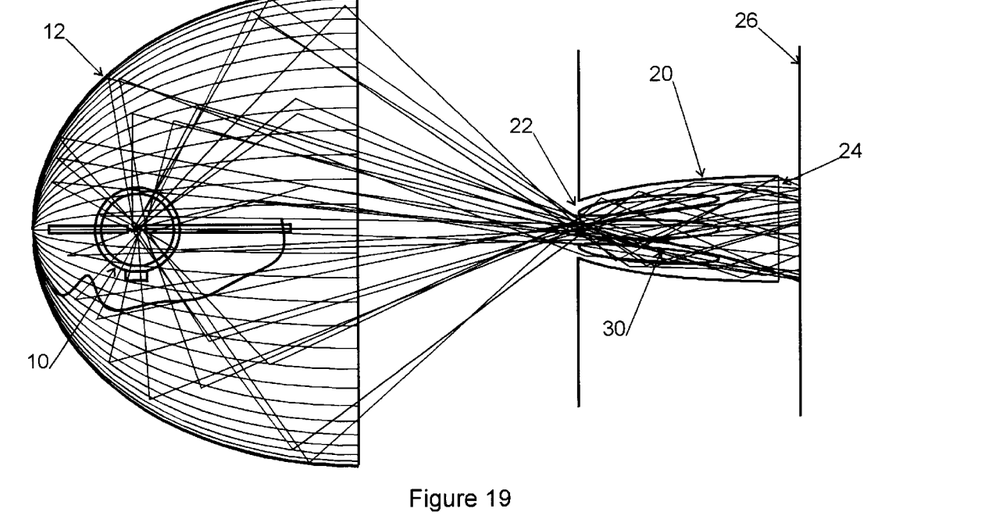
FIG. 19 is a ray-trace diagram of an illumination system with a luned elliptical reflector and a fluted deconcentrator according to the present invention.
Figure 20:
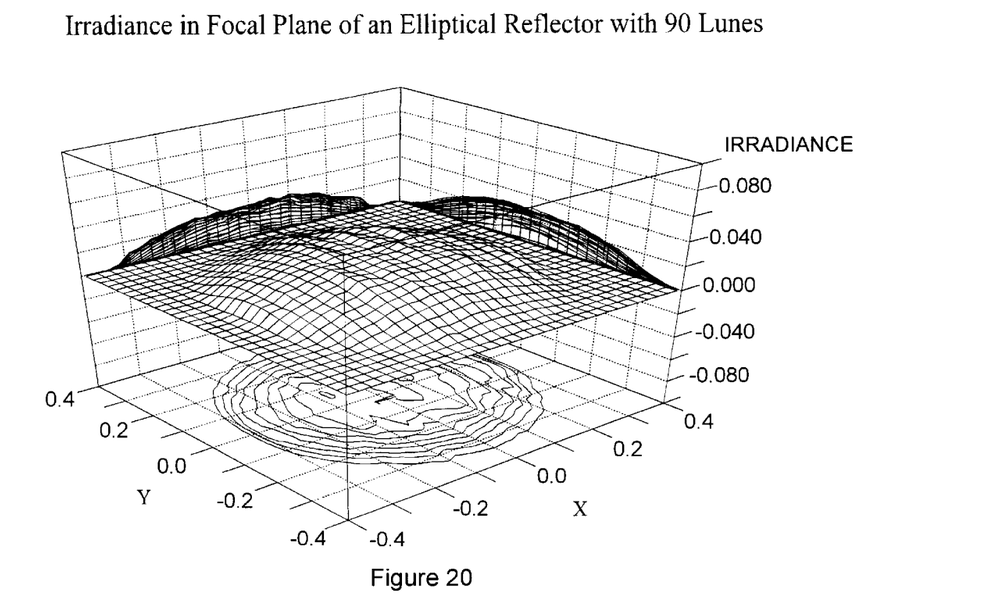
FIG. 20 is a three-dimensional representation of the irradiance in a focal plane of an elliptical reflector having 90 lunes.

Since it may be difficult to completely homogenize the beam by fluting the deconcentrator without causing vignetting in the projection lens, the elliptical reflector 12 may be luned or faceted as shown in FIG. 17 to partially homogenize the radiation incident on the deconcentrator. The luning or facetting is subtle so that the output radiation is still bounded by the output cone of an unperturbed elliptical reflector 12 as described above. This ensures that losses do not occur due to overfilling the deconcentrator's input aperture. As shown in FIG. 18, the irradiance in a focal plane of a smooth elliptical reflector is highly peaked in the center thereof. Substituting a reflector having 90 lunes, for example, in place of a smooth elliptical reflector, as shown in FIG. 19, significantly reduces the central irradiance peak in the focal plane thereof, as shown in FIG. 20. This tends to decrease the performance load requirement on the flutes of the deconcentrator since the input radiation is more nearly uniform upon entering the deconcentrator. Therefore, the design of the deconcentrator can remain primarily directed towards matching the illumination cone of the elliptical reflector to the acceptance cone of the projection lens.

A Solid Deconcentrator

Figure 21:
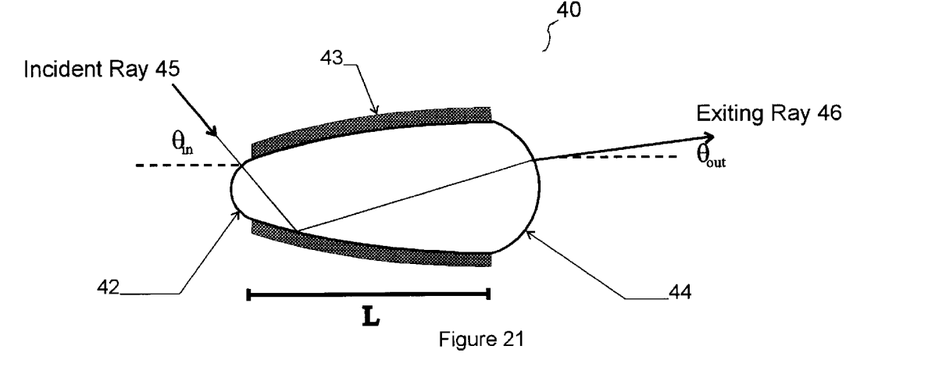
FIG. 21 is a geometric diagram of a solid deconcentrator according to the present invention.

In another aspect of the present invention, and as shown in FIG. 21, a deconcentrating optic 40, called a solid deconcentrator, is a solid piece of glass or other transparent material having a reflective coating applied over an exterior surface 43 thereof except for an input surface 42 and an output surface 44, which remain non-reflective. The input and output surfaces may be coated with an anti-reflective coating to enhance transmission through the surfaces. Such a solid deconcentrator may have a smoothly curved profile as described above, but the curve may be modified to cooperate with refraction at the input surface and refraction at the output surface. A cross-sectional profile of exterior surface 43 may be parabolic, elliptical, hyperbolic, circular or conical; or may be segmented with each segment having a different profile. Surface 43 may be slightly perturbed by a series of flutes, which may be protrusions or indentations in the surface and may be cylindrical, planar, triangular or some other shape. The aperture surfaces may be curved to control refraction in combination with reflections from the reflective coating.

A Solid TIR Deconcentrator

Figure 22:
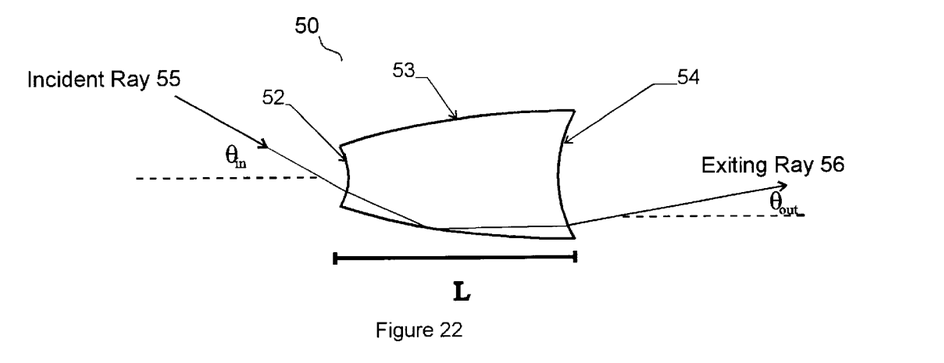
FIG. 22 is a geometric diagram of another solid deconcentrator according to the present invention.

In another aspect of the present invention, and as shown in FIG. 22, a solid deconcentrator 50 utilizes Total Internal Reflection (TIR) in a transparent body having no reflective coating applied. In accordance with this aspect of the invention, TIR conditions determine the shapes of the input and output refracting surfaces. In one embodiment as shown, input surface 52 may be curved to refract an incident ray 55 to an appropriate angle with surface 53 of the transparent body 50 to cause reflection from the surface 53, and output surface 54 may be curved to refract exiting ray 56 to an appropriate angle to keep ray 56 within a cone of desired half-angle. A cross-sectional profile of exterior surface 43 may be parabolic, elliptical, hyperbolic, circular or conical; or may be segmented with each segment having a different profile. Surface 43 may be slightly perturbed by a series of flutes, which may be protrusions or indentations in the surface and may be cylindrical, planar, triangular, or some other shape. The input and output surfaces may be coated with an anti-reflection coating to enhance transmission through the surfaces.

What is claimed is:

1. A reflecting optical device comprising an elongated body having an input aperture and an output aperture, said body having an interior surface connecting said input aperture and said output aperture, a longitudinal cross-sectional profile of said interior surface being defined by a smooth curve that passes through said input aperture and said output aperture such that a first surface normal to said smooth curve at said output aperture is substantially perpendicular to a longitudinal axis of said body, and such that a second surface normal to said smooth curve at said input aperture substantially bisects an angle formed by an input light ray striking an edge of said input aperture and having a maximum angle with respect to said longitudinal axis and an output light ray propagating from said edge of said input aperture and striking an edge of said output aperture.

2. A reflecting optical device according to claim 1, wherein said cross-sectional profile is parabolic.

3. A reflecting optical device according to claim 1, wherein said cross-sectional profile is elliptical.

4. A reflecting optical device according to claim 1, wherein said cross-sectional profile is hyperbolic.

5. A reflecting optical device according to claim 1, wherein said cross-sectional profile is circular.

6. A reflecting optical device according to claim 1, wherein said cross-sectional profile is conical.

7. A reflecting optical device according to claim 1, wherein said cross-sectional profile is segmented, each segment having a different profile.

8. A reflecting optical device according to claim 1, wherein said cross-sectional profile is smooth.

9. A reflecting optical device according to claim 1, wherein said interior surface contains a plurality of flutes.

10. A reflecting optical device according to claim 1, wherein said first surface normal and said second surface normal are slightly inclined in a direction of light ray propagation.

11. A light projection system, comprising:
an elliptical reflector having a first focal point and a second focal point, said reflector also having an output angle;
a light source located at said first focal point of said elliptical reflector;
a projection lens having an acceptance cone having a half angle which is smaller than the output angle of the reflector; and
a reflecting optical device having an input aperture located at said second focal point of said elliptical reflector, an output aperture which is larger than said input aperture, and a reflective inner surface connecting said input aperture and said output aperture, said inner surface reflecting light rays incident upon said input aperture through said output aperture in a beam bounded by a cone having a half angle which is substantially equal to said half angle of said projection lens.

12. A system according to claim 11, wherein said inner surface of said reflecting optical device has a parabolic profile.

13. A system according to claim 11, wherein said inner surface of said reflecting optical device has an elliptical profile.

14. A system according to claim 11, wherein said inner surface of said reflecting optical device has a hyperbolic profile.

15. A system according to claim 11, wherein said inner surface of said reflecting optical device has a circular profile.

16. A system according to claim 11, wherein said inner surface of said reflecting optical device has a conical profile.

17. A system according to claim 11, wherein said inner surface of said reflecting optical device is segmented, each segment having a different profile.

18. A system according to claim 11, wherein said inner surface is smooth.

19. A system according to claim 11, wherein said inner surface contains a plurality of flutes.

20. A system according to claim 11, wherein a first surface normal to said inner surface at said output aperture and a second surface normal to said inner surface at said input aperture are slightly inclined in a direction of light ray propagation.

* * * * *